(12) United States Patent
Jachalsky et al.

(10) Patent No.: US 10,102,450 B2
(45) Date of Patent: Oct. 16, 2018

(54) SUPERPIXEL GENERATION WITH IMPROVED SPATIAL COHERENCY

(71) Applicant: THOMSON LICENSING, Issy de Moulineaux (FR)

(72) Inventors: Joern Jachalsky, Wennigsen (DE); Matthias Reso, Hannover (DE); Bodo Rosenhahn, Ronnenberg (DE)

(73) Assignee: THOMSON LICENSING, Issy les Moulineaux (FR)

( * ) Notice: Subject to any disclaimer, the term of this patent is extended or adjusted under 35 U.S.C. 154(b) by 20 days.

(21) Appl. No.: 14/784,026

(22) PCT Filed: Mar. 18, 2014

(86) PCT No.: PCT/EP2014/055425
§ 371 (c)(1),
(2) Date: Oct. 12, 2015

(87) PCT Pub. No.: WO2014/166709
PCT Pub. Date: Oct. 16, 2014

(65) Prior Publication Data
US 2016/0070982 A1    Mar. 10, 2016

(30) Foreign Application Priority Data
Apr. 12, 2013   (EP) .................................... 13305479

(51) Int. Cl.
*G06K 9/62*   (2006.01)
*G06T 7/11*   (2017.01)
(Continued)

(52) U.S. Cl.
CPC ......... *G06K 9/6218* (2013.01); *G06K 9/6227* (2013.01); *G06T 7/11* (2017.01); *G06T 7/12* (2017.01); *G06T 7/187* (2017.01); *G06T 2207/20016* (2013.01); *G06T 2207/20116* (2013.01)

(58) Field of Classification Search
None
See application file for complete search history.

(56) References Cited

U.S. PATENT DOCUMENTS

2002/0114512 A1* 8/2002 Rao ...................... G06K 9/4652
                                                          382/165
2006/0029275 A1* 2/2006 Li ........................... G06T 11/60
                                                          382/173
(Continued)

OTHER PUBLICATIONS

Li et al., "Partition cortical surfaces into supervertices: method and application", MeshMed 2012, LNCS 7599, Oct. 1, 2012, pp. 112-121.

(Continued)

*Primary Examiner* — Ryan P Potts
(74) *Attorney, Agent, or Firm* — Tutunjian & Bitetto, P.C.

(57) ABSTRACT

A method for generating superpixels for an image comprising pixels and an apparatus configured to perform the method. A clustering stage clusters the pixels into initial clusters. A determination stage then selects spatially coherent parts of the clusters and determines unconnected fragments of the clusters. Pixels of these unconnected fragments are iteratively assigned to adjacent clusters by an assignment stage using a contour evolution process.

15 Claims, 2 Drawing Sheets

(51) Int. Cl.
G06T 7/12 (2017.01)
G06T 7/187 (2017.01)

(56) References Cited

U.S. PATENT DOCUMENTS

| | | | |
|---|---|---|---|
| 2008/0030497 A1* | 2/2008 | Hu | G06K 9/342 |
| | | | 345/419 |
| 2009/0080774 A1* | 3/2009 | Lin | G06K 9/34 |
| | | | 382/176 |
| 2013/0156314 A1* | 6/2013 | Pham | G06T 7/0083 |
| | | | 382/173 |
| 2014/0063275 A1* | 3/2014 | Krahenbuhl | H04N 19/117 |
| | | | 348/208.4 |
| 2014/0119656 A1* | 5/2014 | Lilje | G06T 7/0083 |
| | | | 382/173 |

OTHER PUBLICATIONS

Ren et al.: "Learning a classification model for segmentation"; presented at the Computer Vision (ICCV), 2003. IEEE International Conference on, 2003, pp. 10-17.

Levinshtein et al.: "TurboPixels—Fast Superpixels Using Geometric Flows"; Pattern Analysis and Machine Intellignece, IEEE Transactions on, vol. 31, No. 12, pp. 2290-2297, 2009.

Veksler et al.: "Superpixels and Supervoxels in an Energy Optimization Framework"; in Computer Vision—ECCV 2010, vol. 6315, 2010, pp. 211-224.

Moore et al.: "Superpixel lattices"; presented at the Computer Vision and Pattern Recognition (CVPR), 2008. IEEE Conference on, 2008, pp. 1-8.

Achanta et al.: "SLIC Superpixels"; EPFL Technical Report 149300, Jun. 2010; pp. 1-15.

Levinshtein et al.: "Spatiotemporal Closure"; in Computer Vision—ACCV 2010, vol. 6492, , 2011, pp. 369-382.

Van Den Bergh et al.: "Real-time stereo and flow-based video segmentation with superpixels"; presented at the Applications of Computer Vision (WACV), 2012 IEEE Workshop on, 2012, pp. 89-96.

Achanta et al.: "SLIC Superpixels Compared to State-of-the-Art Superpixel Methods"; Pattern Analysis and Machine Intelligence, IEEE Transactions on, vol. 6, No. 1, pp. 2274-2282, Dec. 2011.

Mester et al.: "Multichannel segmentation using contour relaxation fast super-pixels and temporal propagation"; presented at the SCIA'11: Proceedings of the 17th Scandinavian conference on Image analysis, 2011; pp. 250-261.

Schick et al.: "Measuring and Evaluating the Compactness of Superpixels"; presented at the Pattern Recognition (ICPR) 2012. Internatioal Conference on, 2012, pp. 1-5.

Lloyd "Least squares quantization in PCM"S; Information Theory, IEEE Transactions on, vol. 28, No. 2, pp. 129-137, 1982.

Chen et al.: "A fast boundary-preserving method for image object segmentation";Feb. 2010Authors : Transactions of Beijing Institute of Technology | vol. 30, No. 2 | pp. 183-187.

Sun et al.: "Integrating boundary cue with superpixel for image segmentation"; Aug. 12, 2011;Proceedings of the Sixth International Conference on Image and Graphics ; pp. 33-38.

Van Den Bergh et al.: "SEEDS—Superpixels extracted via energy-driven sampling";Oct. 7, 2012; Computer Vision—ECCV 2012. Proceedings of the 12th European Conference on Computer Vision; Conference Paper; pp. 1-19.

Zhenzhen et al.: "A superpixel-level active contour model with global and local constrains";Mar. 3, 2012;Computer Vision—ECCV 2012. Proceedings of the 12th European Conference on Computer Vision; Conference Paper; pp. 301-304.

Zhou et al.: "Superpixel-driven level set tracking"; Sep. 30, 2012; 2012 19th IEEE International Conference on Image Processing (ICIP 2012); Conference Paper; pp. 409-412.

Gang et al.: "Partition cortical surfaces into supervertices—method and application"; Oct. 1, 2012; Mesh Processing in Medical Image Analysis 2012. Proceedings of MICCAI 2012 International Workshop MeshMed 2012; pp. 112-121.

Reso et al: "Temporally Consistent Superpixels",2013 IEEE International Conference on Computer Vision, IEEE,Dec. 1, 2013 (Dec. 1, 2013) pp. 385-392.

Zhou et al: "Segmentation of petrographic images by integrating edge detection and region growing", Computers and Geosciences, Pergamon Press, vol. 1 . 30, No. 8, Oct. 1, 2004 (Oct. 1, 2004), pp. 817-831.

Ouyang et al: "Robust component-based car detection in aerialimagery with new segmentation techniques", Airborne Intelligence, Surveillance, Reconnaissance (ISR) Systems and Applications VIII, SPIE, vol. 8020, No. 1, May 13, 2011 (May 13, 2011) , pp. 1-10.

Mester et al: "Image Segmentation Using Likelihood Ratio Tests and Markov Region Shape Models", Signal Processing : Theories and Applications. Sep. 5-8, 1988;[Proceedings of the European Signal Processing Conference (EUSIPCO)], vol. 2, Sep. 5, 1988 (Sep. 5, 1998), pp. 837-840.

Search Report dated Jul. 2, 2014.

* cited by examiner

SUPERPIXEL GENERATION WITH IMPROVED SPATIAL COHERENCY

This application claims the benefit, under 35 U.S.C. § 365 of International Application PCT/EP2014/055425, filed Mar. 18, 2014, which was published in accordance with PCT Article 21(2) on Oct. 16, 2014 in English and which claims the benefit European patent application No. 13305479.1, filed Apr. 12, 2013.

FIELD OF THE INVENTION

The invention relates to a solution for generating superpixels with an improved spatial coherency. In particular, the invention proposes a solution for generating superpixels with an improved spatial coherency, which makes use of contour evolution as a post processing step after an initial clustering.

BACKGROUND OF THE INVENTION

Superpixel algorithms represent a very useful and increasingly popular preprocessing step for a wide range of computer vision applications (segmentation, image parsing, classification etc.). Grouping similar pixels into so called superpixels leads to a major reduction of the image primitives, i.e. of the features that allow a complete description of an image, which results in an increased computational efficiency for subsequent processing steps or allows for more complex algorithms, which would be computationally infeasible on pixel level, and creates a spatial support for region-based features.

Superpixel algorithms group pixels into superpixels, "which are local, coherent, and preserve most of the structure necessary for segmentation at scale of interest" [1]. Superpixels should be "roughly homogeneous in size and shape" [1]. Further interesting superpixel approaches mostly targeting still images are described in [2, 3, 4, 5, 9]. Approaches targeting video sequences are described in [3, 6, 7, 8].

Superpixels based on clustering approaches require in general a special post processing step in order to ensure the spatial coherency of the pixels comprised by each superpixel, as the clustering itself does not necessarily lead to spatially coherent superpixels. Such a post processing step can assign each split-off fraction, which is not connected to the main mass of the corresponding superpixel, to its nearest adjacent superpixel (cf. [5,8]). This ensures the spatial connectivity of the pixels comprised in the clusters. Contour evolution approaches like [9, 10] can overcome this drawback in general at the cost of a high number of iterations.

SUMMARY OF THE INVENTION

It is an object of the present invention to propose a solution for generating superpixels with an improved spatial coherency.

According to the invention, a method for generating superpixels for an image comprising pixels comprises the steps of:
 clustering the pixels into initial superpixels;
 determining unconnected fragments of the initial superpixels; and
 assigning pixels of the unconnected fragments to adjacent superpixels using a contour evolution process.

Accordingly, an apparatus configured to generate superpixels for an image comprising pixels comprises:
 a clustering stage configured to cluster the pixels into initial superpixels;
 a determination stage configured to determine unconnected fragments of the initial superpixels; and
 an assignment stage configured to assign pixels of the unconnected fragments to adjacent superpixels using a contour evolution process.

Also, a computer readable storage medium has stored therein instructions enabling generating superpixels for an image comprising pixels, which when executed by a computer, cause the computer to:
 cluster the pixels into initial superpixels;
 determine unconnected fragments of the initial superpixels; and
 assign pixels of the unconnected fragments to adjacent superpixels using a contour evolution process.

In [10] it was stated that the post processing method proposed in [8] assigns the isolated superpixel fragments to arbitrary neighboring superpixels without considering any similarity measure between the fragments and the superpixels they are assigned to. Contour evolution approaches like [9, 10] can overcome this drawback in general at the cost of a high number of iterations.

The proposed solution combines the fast initial convergence properties of a clustering approach with the color- and boundary-sensitivity of a contour evolution approach. In the first step of the processing, a cluster approach is used for a fast initial convergence. Then, in the second step, an especially adjusted contour evolution approach is utilized for the post processing. The assignment of the pixels of split-off fragments to a cluster or superpixel is performed in correspondence with the energy term used for the clustering. As a result the generated superpixels exhibit a high boundary/contour accuracy. At the same time the large number of iterations required for conventional contour evolution approaches is avoided, as the solution shows a fast convergence.

The resulting superpixels with high boundary/contour accuracy are beneficial for a wide range of computer vision applications ranging from segmentation, image parsing to classification etc.

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims.

DETAILED DESCRIPTION OF PREFERRED EMBODIMENTS

Figure 1:
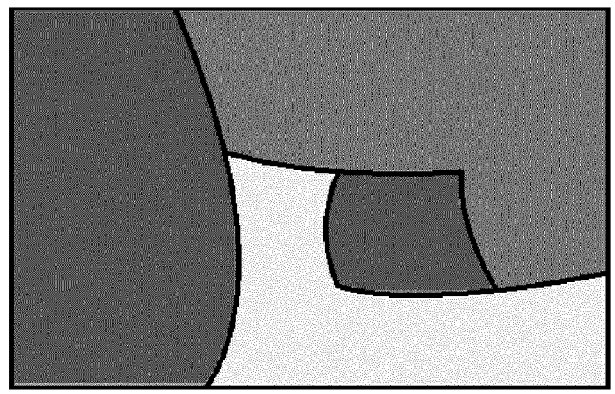
FIG. 1 depicts exemplary clusters after an initial clustering.

In the approach proposed herein, contour evolution is applied as a post processing step after an initial clustering in order to ensure the spatial coherency of the pixels comprised by each superpixel.

For a better comprehensibility of the proposed approach first the initial clustering is described and then the contour evolution, which is applied as a post processing step.

For the initial clustering, pixels of an image are seen as data points in a multi-dimensional feature space, in which each dimension corresponds to a color channel or image coordinate of the pixels. Superpixels are represented by clusters in this multi-dimensional feature space and each data point can only be assigned to one cluster. This assignment finally determines the over-segmentation and thus the superpixel generation. In order to find an optimal solution for this assignment problem, an energy function $E_{total}$ is defined, which sums up the energy E(n,k) that is needed to assign a data point n∈N to a cluster k∈K:

$$E_{total} = \sum_{n \in N} E(n, k), \qquad (1)$$

where N is the set of pixels in the image and K is the set of cluster centers representing the superpixels. The energy E(n,k) can be further refined as the weighted sum of a color-difference related energy $E_c$(n,k) and a spatial-distance-related energy $E_s$(n,k):

$$E(n,k) = (1-\alpha) \cdot E_c(n,k) + \alpha \cdot E_s(n,k). \qquad (2)$$

The energy $E_c$(n,k) is directly proportional to the Euclidean distances between a data point n and the color center of cluster k in the chosen color space. Likewise $E_s$(n,k) is proportional to the Euclidean distance of the spatial position of n and the spatial position of the center of cluster k. In order to make the results independent from the image size, the spatial distance is scaled with the factor $1/\sqrt{(|N|/|K|)}$, where |•| is the number of elements in a set. With the parameter α that was introduced in [10] the user can steer the segmentation results to be more compact or more sensitive to fine-grained image structures. For a given number of clusters |K| and a user-defined α, an optimal over-segmentation in terms of energy can be determined by finding a constellation of clusters that minimizes $E_{total}$. The assignment problem is solved by applying the iterative Lloyd's algorithm [11], which converges to a locally optimal solution. The initial spatial position of the cluster centers is grid-like including a perturbation of the spatial centers towards the lowest gradient in a 3×3 neighborhood (see [2,8]). To minimize the energy term $E_{total}$ the algorithm iterates two alternating steps, the assignment-step and the update-step. In the assignment-step, each data point n is assigned to the cluster for which the energy term E(n,k) has its minimum given the fixed set K of cluster centers. Based on these assignments, the parameters of the cluster centers are re-estimated in the update-step by calculating the mean color and mean position of their assigned pixels. The iteration stops when no changes in the assignment-step are detected or a maximum number of iterations has been performed. As the spatial extent of the superpixels is known to be limited a priori, it is sufficient in the assignment-step to search for pixels only in a limited search window around each cluster center.

Figure 2:
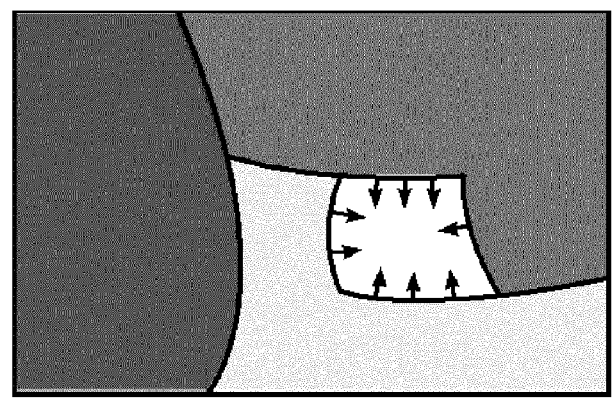
FIG. 2 shows how a contour evolution process acts on a split-off fragment of an initial cluster.
Figure 3:
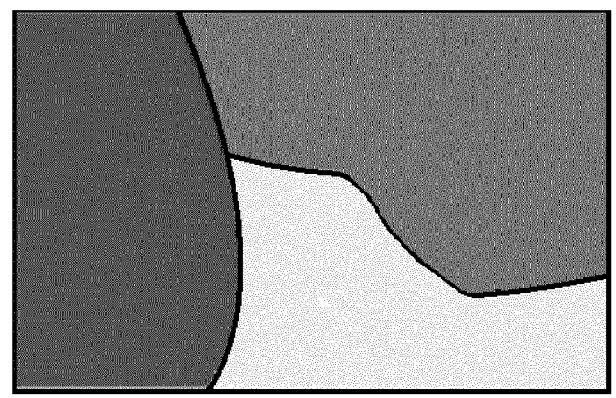
FIG. 3. depicts the resulting clusters after application of the contour evolution process.

Subsequently, at the beginning of the contour evolution, for each cluster the largest spatially coherent part is determined. Then, all unconnected fragments of the cluster are set to unassigned and marked as mutable. FIGS. 1 to 3 show a small example of this approach. FIG. 1 depicts the clusters after the initial clustering. The dark grey cluster is not completely spatially coherent. As shown in FIG. 2 the small split-off fragment is set to unassigned and marked as mutable. The contours of the medium grey and the light grey cluster adjacent to the marked fragment can evolve into this region during the contour evolution iterations. The resulting clusters after application of the contour evolution process are shown in FIG. 3.

Only those pixels that are in a region marked as mutable are processed, the other pixels are unaffected. In each iteration of the contour evolution the cluster assignment for those pixels at a boundary within a region marked as mutable can be changed. The assignment of a pixel is changed if the pixel has no assignment. Then, it is assigned to the cluster of one of its adjacent pixels, which minimizes the energy term E(n,k). In addition, an assignment of a pixel is changed to the cluster of one of its adjacent pixels if the energy term E(n,k) is smaller for this cluster than for the one it was previously assigned to. The iterations are stopped if all pixels in the marked region are assigned to a cluster and no further changes at the boundaries occur. The resulting spatially coherent clusters are the final superpixels.

Figure 4:
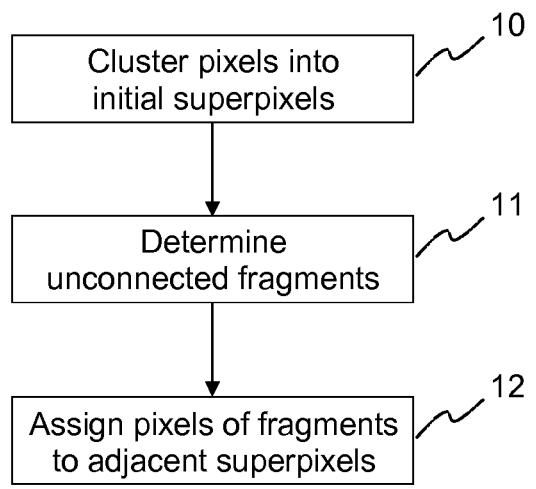
FIG. 4 schematically illustrates a method according to the invention.

FIG. 4 schematically illustrates a method according to the invention for generating superpixels for an image comprising pixels. In a clustering step 10 the pixels are clustered into initial superpixels. Then unconnected fragments of the initial superpixels are determined 11. Finally, pixels of the unconnected fragments are assigned 12 to adjacent superpixels using a contour evolution process.

Figure 5:
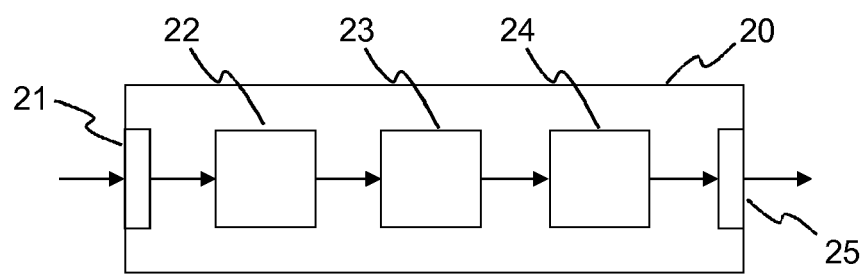
FIG. 5 schematically illustrates an apparatus configured to perform a method according to the invention.

An apparatus 20 configured to perform the method according to the invention is schematically depicted in FIG. 5. The apparatus 20 has an input 21 for receiving an image or a sequence of images and a clustering stage 22 configured to cluster 10 the pixels into initial superpixels. A determination stage 23 determines 11 unconnected fragments of the initial superpixels. Pixels of these unconnected fragments are assigned 12 to adjacent superpixels by an assignment stage 24 using a contour evolution process. The superpixels obtained in this way are preferably output via an output 25. Of course, the different stages 22, 23, 24 may likewise be fully or partially combined into a single unit or implemented as software running on a processor.

REFERENCES

[1] X. Ren et al.: "*Learning a classification model for segmentation*", IEEE International Conference on Computer Vision (ICCV) (2003), pp. 10-17.

[2] A. Levinshtein et al.: "*TurboPixels: Fast Superpixels Using Geometric Flows*", IEEE Transactions on Pattern Analysis and Machine Intelligence Vol. 31 (2009), pp. 2290-2297.

[3] O. Veksler et al.: "*Superpixels and Supervoxels in an Energy Optimization Framework*", Proceedings of the 11th European conference on Computer vision (ECCV) (2010), pp. 211-224.

[4] A. P. Moore et al.: "*Superpixel lattices*", IEEE Conference on Computer Vision and Pattern Recognition (CVPR) (2008), pp. 1-8.

[5] R. Achanta et al.: "*SLIC Superpixels*", EPFL Technical Report 149300, June 2010.

[6] A. Levinshtein et al.: "*Spatiotemporal Closure*", Proceedings of the 10th Asian conference on Computer vision (ACCV) (2010), pp. 369-382.

[7] M. Van den Bergh et al.: "*Real-time stereo and flow-based video segmentation with superpixels*", IEEE Workshop on Applications of Computer Vision (WACV) (2012), pp. 89-96.

[8] R. Achanta et al.: "*SLIC Superpixels Compared to State-of-the-Art Superpixel Methods*", IEEE Transactions on Pattern Analysis and Machine Intelligence Vol. 34 (2012), pp. 2274-2282.

[9] R. Mester et al.: "*Multichannel segmentation using contour relaxation: fast super-pixels and temporal propagation*", Proceedings of the 17th Scandinavian conference on Image analysis (SCIA '11) (2011), pp. 250-261.

[10] A. Schick et al.: "*Measuring and Evaluating the Compactness of Superpixels*", International Conference on Pattern Recognition (ICPR) (2012), pp. 1-5.

[11] S. P. Lloyd: "*Least squares quantization in PCM*", IEEE Transactions on Information Theory Vol. 28 (1982), pp. 129-137.

The invention claimed is:

1. A method for generating superpixels for an image having pixels, the method comprising:
   clustering the pixels into initial clusters;
   determining one spatially coherent part of each of the clusters, all other parts of each cluster being considered as unconnected fragments and being set to unassigned and marked as mutable; and
   assigning pixels of the unconnected fragments to adjacent clusters using a contour evolution process based on the spatially coherent parts of the clusters as initial adjacent clusters that processes only the pixels that are in a region marked as mutable.

2. The method according to claim 1, wherein in each iteration of the contour evolution cluster assignments for pixels at a boundary within a region marked as mutable can be changed.

3. The method according to claim 2, wherein the cluster assignment of a pixel is changed if the pixel has no assignment.

4. The method according to claim 3, wherein the pixel is assigned to that cluster of one of its adjacent pixels which minimizes an energy term used for the initial clustering.

5. The method according to claim 1, wherein an assignment of a pixel is changed to the cluster of one of its adjacent pixels if an energy term is smaller for this cluster than for the cluster to which the pixel was previously assigned.

6. An apparatus configured to generate superpixels for an image having pixels, wherein the apparatus comprises:
   at least one processor configured to:
   cluster the pixels into initial clusters;
   determine one spatially coherent part of each of the clusters, all of the other parts of each cluster being considered as unconnected fragments and being set to unassigned and marked as mutable; and
   assign pixels of the unconnected fragments to adjacent clusters, using a contour evolution process based on the spatially coherent parts of the clusters as initial adjacent clusters that processes only the pixels that are in a region marked as mutable.

7. The apparatus according to claim 6, wherein in each iteration of the contour evolution cluster assignments for pixels at a boundary within a region marked as mutable can be changed.

8. The apparatus according to claim 7, wherein said at least one processor is configured to change the cluster assignment of a pixel if the pixel has no assignment.

9. The apparatus according to claim 8, wherein said at least one processor is configured to assign the pixel to that cluster of one of its adjacent pixels which minimizes an energy term used for the initial clustering.

10. The apparatus according to claim 6, wherein said at least one processor is configured to change an assignment of a pixel to the cluster of one of its adjacent pixels if an energy term is smaller for this cluster than for the cluster to which the pixel was previously assigned.

11. A computer readable non-transitory storage medium having stored therein instructions enabling generating superpixels for an image having pixels, which, when executed by a computer, cause the computer to:
    cluster the pixels into initial clusters;
    determine one spatially coherent part of each of the clusters;
    determine unconnected fragments of the clusters, all other parts of each cluster being considered as unconnected fragments and being set to unassigned and marked as mutable; and
    assign pixels of the unconnected fragments to adjacent clusters using a contour evolution process based on the spatially coherent parts of the clusters as initial adjacent clusters that processes only the pixels that are in a region marked as mutable.

12. The computer readable non-transitory storage medium according to claim 11, wherein in each iteration of the contour evolution cluster assignments for pixels at a boundary within a region marked as mutable can be changed.

13. The computer readable non-transitory storage medium according to claim 12, wherein the instructions cause the computer to change the cluster assignment of a pixel if the pixel has no assignment.

14. The computer readable non-transitory storage medium according to claim 13, wherein the instructions cause the computer to assign the pixel to that cluster of one of its adjacent pixels which minimizes an energy term used for the initial clustering.

15. The computer readable non-transitory storage medium according to claim 11, wherein the instructions cause the computer to change an assignment of a pixel to the cluster of one of its adjacent pixels if an energy term is smaller for this cluster than for the cluster to which the pixel was previously assigned.

* * * * *